(12) United States Patent
Boehnke (10) Patent No.: US 8,532,639 B2
(45) Date of Patent: Sep. 10, 2013

(54) CALL CORRECTING RELAY SYSTEM FOR OPTIMIZING CALL RELAYING BETWEEN DIFFERENT TELECOMMUNICATION NETWORKS

(75) Inventor: Norbert Boehnke, Munich (DE)

(73) Assignee: Trinity Holding AG, Baar (CH)

( * ) Notice: Subject to any disclaimer, the term of this patent is extended or adjusted under 35 U.S.C. 154(b) by 42 days.

(21) Appl. No.: 13/320,394

(22) PCT Filed: May 14, 2010

(86) PCT No.: PCT/EP2010/002988
§ 371 (c)(1),
(2), (4) Date: Feb. 1, 2012

(87) PCT Pub. No.: WO2010/130463
PCT Pub. Date: Nov. 18, 2010

(65) Prior Publication Data
US 2012/0122439 A1    May 17, 2012

(30) Foreign Application Priority Data

May 14, 2009    (DE) .................... 20 2009 006 953 U (51) Int. Cl.
*H04M 3/42*    (2006.01)
(52) U.S. Cl.
USPC ..... 455/415; 455/411; 455/414.1; 455/422.1; 455/435.1
(58) Field of Classification Search
USPC ................ 455/415, 411, 414.1, 422.1, 435.1
See application file for complete search history.

(56) References Cited

U.S. PATENT DOCUMENTS

| | | | |
|---|---|---|---|
| 6,628,778 B1* | 9/2003 | Satomi et al. | 379/265.02 |
| 7,096,043 B1 | 8/2006 | Sylvain | 455/565 |
| 7,224,686 B1* | 5/2007 | Doskow et al. | 370/352 |
| 2009/0023427 A1 | 1/2009 | Kahn et al. | 455/414.1 |

FOREIGN PATENT DOCUMENTS

| | | |
|---|---|---|
| DE | 10309578 | 9/2004 |
| EP | 0910199 | 4/1999 |

OTHER PUBLICATIONS

International Search Report, mailed Sep. 30, 2010, for PCT/EP2010/002988, 3 pages.

* cited by examiner

*Primary Examiner* — Nghi H Ly
(74) *Attorney, Agent, or Firm* — Seed IP Law Group PLLC (57) ABSTRACT

The invention relates to a device for call correcting relaying of telecommunication connections between at least two telecommunication terminal devices, wherein the telecommunication terminal devices each are registered in different telecommunication networks, comprising at least two telecommunication terminal devices, wherein each telecommunication terminal device has a software component set up for initializing outgoing call requests from the telecommunications terminal devices and thereby for providing information about a desired target telephone number by means of an established telecommunication connection, wherein the software component is further set up for analyzing the identity of the calling location for incoming call requests and declining particular call requests on the basis of the identity analysis and initializing an outgoing call request as a response to the declining; at least one fixed network server, wherein the fixed network server comprises at least one switching component and comprises devices providing interconnection functionality, so that the fixed network server constitutes a neutral telecommunication network; and software-implemented device on the fixed network server that are set up so that an incoming call request to the fixed network server from a first telecommunication terminal device is analyzed with regard to the identity of the requesting telecommunication terminal device and a connection to the requesting telecommunication terminal device is permitted and established as a reaction to the identity analysis, and a desired telecommunication connection to a second telecommunication terminal device is produced on the basis of the identity analysis and the established connection.

20 Claims, 5 Drawing Sheets

CALL CORRECTING RELAY SYSTEM FOR OPTIMIZING CALL RELAYING BETWEEN DIFFERENT TELECOMMUNICATION NETWORKS

The present invention basically relates to a computer-implemented system for the call-directing switching of telecommunication links from one mobile telecommunication terminal to another mobile telecommunication terminal, with the telecommunication terminals each being registered in different telecommunication networks, with the use of software components installed on the telecommunication terminals and of a central or neutral fixed network server providing a call-directing optimization method.

Traditionally, fixed networks were used for the communication of speech. Calls were established via permanently installed terminals and line-based networks. Nowadays, however, these traditional possibilities are supplemented with more flexible and user-friendly call switchings via mobile radio networks or also satellite networks. These mobile telecommunication networks provide the final user with the advantage that the telecommunication terminal, e.g. a telephone, is no longer bound to a permanently installed line, but can be carried along and used anywhere and at any time.

The development and installation of these mobile radio networks required significant investments, which leads to significantly higher costs for switching calls through mobile radio networks, in comparison with the switching of calls through (more traditional) fixed networks. In particular, this is the case if calls are to be terminated from one mobile terminal to another mobile terminal, and if both mobile terminals are registered in different networks of different network operators.

For the telecommunication in fixed networks so-called "flat rates" are nowadays available, which allow an indefinitely great time budget for making calls at a fixed amount per time unit (e.g. per month). Similar cost-efficient conditions for telecommunication in mobile radio networks and the termination of calls between mobile networks are unknown, however, because the respective mobile radio operators charge significantly higher costs for the call establishment to a "mobile" user.

Although a mobile telecommunication terminal originated call, too, is frequently switched to a fixed network infrastructure already after a short distance of the transmission link, the final user of this telecommunication terminal is nevertheless charged with "mobile" rates, that is, significantly higher switching rates, in particular if a connection from a mobile telecommunication terminal to another mobile telecommunication terminal is provided.

This applies above all in those cases in which the mobile telecommunication terminals are registered with the operators of different mobile radio networks so that, in this case, namely for the switching of calls between these two telecommunication terminals, the one mobile network operator is charged by the respective other mobile radio network operator with a correspondingly high switching fee for the termination of the connection.

This problem is further aggravated if, instead of another mobile radio terminal, so-called value-added services or service numbers are selected and dialed from a mobile telecommunication terminal. This may cause—perhaps unintentionally—enormous switching and service fees.

This is particularly problematical for organizations that provide their members with telecommunication terminals for official use. For instance, if a service telephone is provided in a company, typically all calls from this telephone are routed via a central telephone system of this company, allowing the company to control each one of these telephones, namely which calls or destination call numbers can be dialed—and which ones cannot. Hence, the company is able to perform a cost control for these fixed network telephones at any time and guarantee by means of permission levels (e.g. international calls are permitted or not permitted) a very finely structured cost and permission control.

For mobile phones, however, a similar control by organizations and companies is impossible. Here, the call is not controlled by a company-internal unit, but is routed directly from the mobile terminal into the network of the respective mobile radio operator, from where it is terminated to the destination call number in the network relevant for this number. Therefore, the misuse, which might be unintentional, cannot be preemptively prevented by companies. In particular, a company is unable to implement a leveled permission concept with respect to the destination call numbers that are permitted or not permitted.

Hence, there is a need for a call-directing switching system that optimizes the switching of calls between telecommunication networks of different operators.

This object is achieved with the subject matter as claimed in the independent claims.

Preferred embodiments are specified in the dependent claims.

According to one aspect of the present invention this object is achieved with a system for the call-directing switching of calls between at least two telecommunication terminals, with the telecommunication terminals each being registered in different telecommunication networks. The system comprises at least two telecommunication terminals each of which includes a software component stored and installed on the respective telecommunication terminal. This software component is adapted to initialize call requests originating at the telecommunication terminal, e.g. a mobile phone, and to transfer information about a desired destination call number via an established communication link as an outgoing call request is initialized. Specifically, this software component is further adapted to analyze call requests received by the telecommunication terminal with respect to their identity of the calling party, and to refuse or interrupt call requests on the basis of the identity analysis, and to initialize a call request originating at the telecommunication terminal.

The system further comprises at least one fixed network server including at least one switching component, and also including units that provide interconnection functionalities, so that this fixed network server is installed as a neutral telecommunication network and constitutes and represents such a telecommunication network also compared to other telecommunication networks.

This system further comprises software-implemented units that are stored and installed on the fixed network server. These software-implemented units are adapted in such a way that a call request received by a fixed network server from a first telecommunication terminal is analyzed with respect to the identity of the requesting telecommunication terminal, that a connection to the requesting telecommunication terminal is established in response to this identity analysis, and that a desired telecommunication link to a second telecommunication terminal is established on the basis of the identity analysis and the established connection.

Hence, the present invention is inter alia based on the knowledge that the switching of a call from a first telecommunication terminal registered in a first telecommunication network to a second telecommunication terminal registered in a second telecommunication network different from the first one requires a termination of this call from the first network operator of the first telecommunication network to the second network operator of the other, second telecommunication network. The present invention is further based on the knowledge that this termination incurs comparatively high costs, in particular if the first and second telecommunication networks are mobile telecommunication networks, for instance a mobile telephone network, or if at least the second telecommunication network is provided and operated by a value-added service provider or teleservice provider.

Hence, the present invention is also based on the knowledge that a control and, ideally, the reduction of the occurring termination costs would be desirable for this termination of calls between telecommunication terminals, e.g. telephones or mobile phones that are registered in different telecommunication networks. This knowledge is particularly based on the fact that, for instance, in the case where the telecommunication terminals are provided as service telephones by an organization, e.g. a company, the provider of the telephones, i.e. the company, has an economical interest in the efficient use of these telecommunication terminals intended for official use. Therefore, it is desirable for such a company to control the efficient and economical use of these telecommunication terminals and, furthermore, to avoid the intended or unintended misuse.

Hence, according to another aspect, the object of the present invention is achieved with a fixed network server comprising one or more components that provide an interconnection functionality so that the server works as an independent, neutral communication network thereby providing switching and connectivity features, so that this fixed network server represents and constitutes a neutral fixed network telecommunication network compared to other telecommunication networks. The fixed network server further comprises at least one switching component which is adapted to interconnect at least two connections from a first and a second telecommunication terminal to the fixed network server to one connection, so that a telecommunication link between the first and the second telecommunication terminal, and in particular only one desired telecommunication link between the first and a second telecommunication terminal is established.

This fixed network server further comprises software-implemented units which are adapted in such a way that a call request received by the fixed network server from the first telecommunication terminal is analyzed with respect to the identity of this requesting telecommunication terminal, that a connection to the requesting telecommunication terminal is established in response to this identity analysis, and that the desired telecommunication link to the second telecommunication terminal is established on the basis of the identity analysis and the established connection.

Thus, this aspect of the present invention particularly yields the advantage for the user that exclusively desired telecommunication links between two telecommunication terminals are established via the fixed network server. Hence, the present invention is further also based on the knowledge that, once a destination call number has been inputted into a first telecommunication terminal, it may be desirable to verify whether the call number for this desired call belongs, for instance, to a list of permitted numbers (white list) or whether this number belongs to a list of prohibited numbers (black list). By means of this verification, in case this control is accomplished on the basis of a white list, such a telecommunication link would be established as the desired telecommunication link, with the desired destination call number being identifiable on another list. Correspondingly, in case the control is accomplished on the basis of a black list, such a link would only be established as a desired telecommunication link if the desired destination call number cannot be found on a black list.

In case of fixed network telephones which can make call requests, for instance, via a company's telephone switching system, either to one another or to other telecommunication networks, this control on the basis of black and white lists is accomplished via the central switching system of this company's telephone network. Thus, a company usually prevents by means of this central switching system that cost-intensive service call numbers can be dialed. Furthermore, this central switching system allows the setting of authorizations for individual telephones in such a way that these telephones are permitted—or not permitted—to dial, for instance, international call numbers.

Hence, the present invention is also based on the knowledge that especially in the case of mobile telecommunication terminals, i.e. mobile phones, it is impossible to provide such a control and similar permission concept, unless a similar central entity or neutral entity is connected between the requesting telecommunication terminal and the destination telecommunication terminal. Exactly this entity is provided by the fixed network server according to the invention, so that the advantages of a company-internal switching unit or switching system can be preserved, even if the corresponding calls are conducted via mobile terminals, e.g. mobile phones.

According to another aspect the present object is achieved with a telecommunication terminal that is registered in a telecommunication network. This telecommunication terminal, e.g. a mobile phone, comprises an input interface for the input of a desired destination call number. The telecommunication terminal further comprises a connection unit for establishing a connection in a telecommunication network, e.g. the telecommunication network in which the telecommunication terminal is registered.

The telecommunication terminal according to the invention further comprises one or more software components that are stored and installed in the telecommunication terminal and that are adapted to initialize call requests originating at the telecommunication terminal and to transfer information about a desired destination call number via an established telecommunication link as an outgoing call request is initialized. The software component is further adapted to analyze call requests received by the telecommunication terminal with respect to the identity of the calling party, and to refuse call requests on the basis of the identity analysis, and to initialize a call request originating at the telecommunication terminal.

Figure 1:
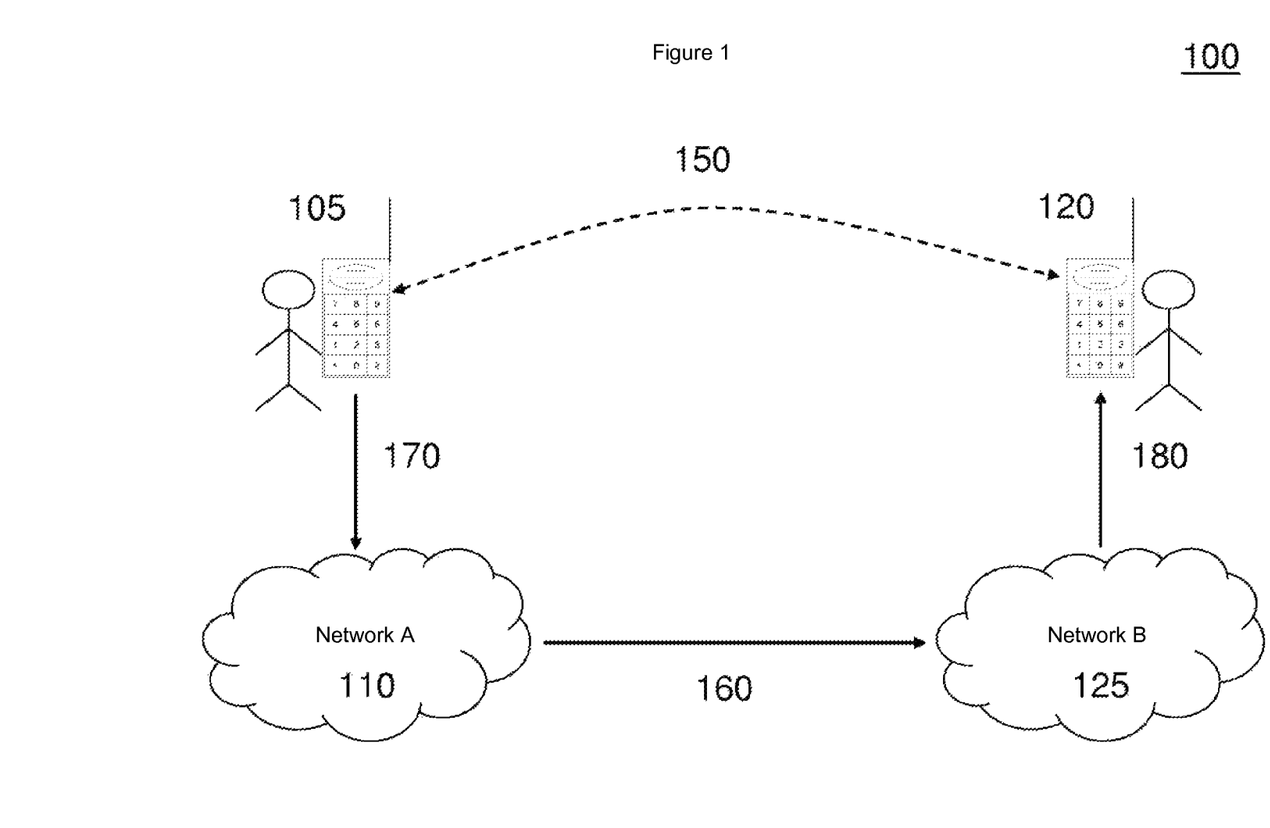
FIG. 1 shows a schematic view of a simplified telecommunication switching system according to the prior art.

Additional preferred embodiments are specified in the dependent claims and shall be described below with reference to the accompanying drawings. In the drawings:

FIG. 1 shows a simplified schematic view of a switching of calls and/or telecommunication services between terminals that are registered in networks of different operators.

The telecommunication system 100 comprises telecommunication terminals 105 and 120. According to a preferred embodiment these telecommunication terminals are designed as mobile telecommunication terminals, preferably as mobile phones. The design as a mobile telecommunication terminal or mobile phone shown in FIG. 1 is merely of an exemplary nature, however, just like the number of the registered telecommunication terminals shown. Specifically, practically any number of telecommunication terminals 105/120 may be registered in the respective telecommunication networks 110 and 125, and the respective telecommunication terminals may be of different types. Specifically, these telecommunication terminals could be mobile phones, fixed network phones or also server infrastructures. For instance, at least one telecommunication terminal 120 may be realized as the infrastructure of a telecommunication service or teleservice. This teleservice provides, for instance, services in terms of value-added services, service hotlines, media services or the like.

FIG. 1 shows by way of an example that a desired telecommunication link 150, e.g. a call 150, between an optional telecommunication terminal 105 registered in telecommunication network 110 requires the establishment of a connection 160 from telecommunication network 110 to telecommunication network 125. In the schematic representation of FIG. 1 the telecommunication network 110, e.g. the mobile radio network A, is provided by a network operator A, while the telecommunication network 125, e.g. the mobile radio network B, is provided by provider B. For switching through the call 150, which is initiated by telecommunication terminal 105 and directed to telecommunication terminal 120, the network operator A therefore has to forward this call request 170 from telecommunication terminal 105 via network 125 of network operator B to the telecommunication terminal 120. According to the prior art the network operator B is entitled to charge network operator A with a significant service charge or termination fee for this forwarding or termination, respectively. These termination fees are largely regulated on an international basis, so that specifically the termination into fixed networks incurs moderate fees, while the fees for the termination into mobile telecommunication networks are considerably higher, for instance by a factor of 10.

Therefore, if the user of terminal 105 wishes to call the user of terminal 120, the user inputs the call number of terminal 120 into terminal 105. Upon confirming this input a connection 170 is established by telecommunication terminal 105 to network 110 in which telecommunication terminal 105 is registered by network operator A. However, since telecommunication terminal 120 is registered in network 125 of network operator B, the network operator A is unable to establish a direct connection from network 110 to telecommunication terminal 120. Network operator A of network 110 will rather forward the switching request of telecommunication terminal 105 via connection 160 to network operator B of network 125, who then eventually establishes via connection 180 to telecommunication terminal 120 the link 150 between telecommunication terminals 105 and 120.

In the example of FIG. 1 the link 150 is preferably established between two mobile terminals 105 and 120, so that the networks 110 and 125 are, in this example, realized as mobile telecommunication networks. In this case significant switching costs would be correspondingly charged by network operator B for connection 160 to the account of network operator A, who correspondingly charges these costs to the account of the user of terminal 105.

According to another embodiment a telecommunication terminal 120 is designed as a value-added infrastructure device. In this case a connection to a telecommunication value-added service, a teleservice or the like is provided by telecommunication terminal 105 via link 150. This service will charge once more correspondingly higher fees.

Hence, it cannot be guaranteed with this telecommunication switching and call termination according to the prior art that terminal 105 establishes only those links 150 that are desired in order for the intended or unintended misuse to be preemptively precluded. Moreover, this link 150 according to the prior art is not at all cost-optimized as a relatively expensive termination into a mobile network becomes due in each case.

Figure 2:
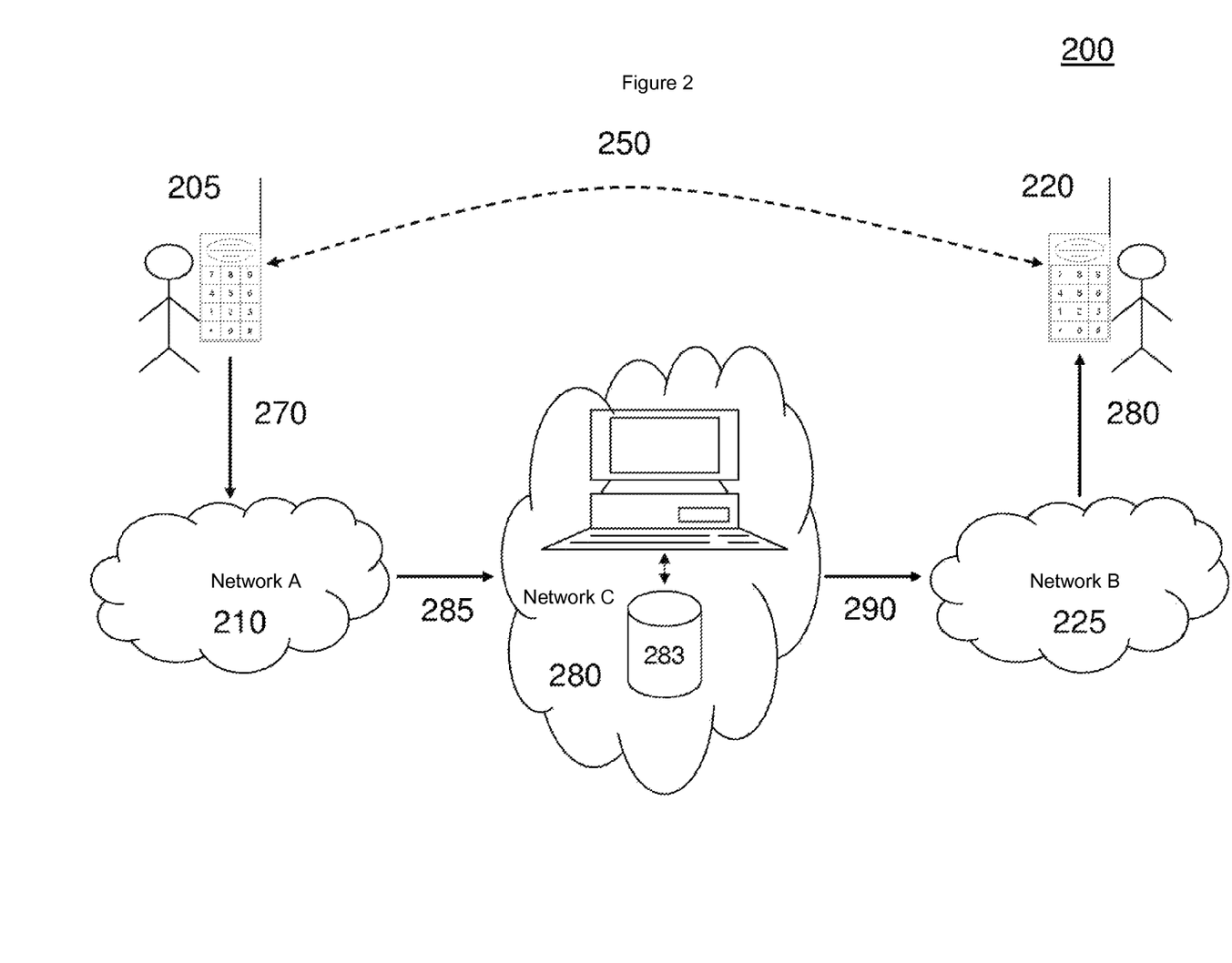
FIG. 2 shows a schematic view of a simplified telecommunication switching system according to a preferred embodiment of the present invention.

FIG. 2 now shows an inventively optimized switching system 200 for providing a link 250 between the telecommunication terminals 205, 220. In this schematic representation, which is based on FIG. 1, the realization of the telecommunication terminals 205 and 220 as mobile telecommunication terminals or mobile telephones is merely of an exemplary nature, just like the number of these telecommunication terminals shown in this figure. In fact, according to the present invention, any number of telecommunication terminals 205 may be registered in network 210, and any number of telecommunication terminals 220 may be registered in network 225.

Similar to the prior art represented above, the representation according to FIG. 2, too, aims at a link 250 between the telecommunication terminals 205 and 220. Again, in order to establish this link 250, the telecommunication terminal 205 will establish a connection 270 to network 210, which is provided by network operator A and in which the telecommunication terminal 205 is registered.

According to a preferred embodiment of the present invention, however, no direct connection is established to network 225 of network operator B, who provides network 225 and in which telecommunication terminal 220 is registered. Rather, a connection 285 is established from telecommunication terminal 205 via network 210 to a central gateway 280, and a connection 290 is switched, again, from this central gateway 280 to network 225. Preferably, the central gateway 280 is realized as a neutral fixed network server which, similar to networks 210 and 225, is allocated to a network operator C. In a preferred embodiment the network server 280 is realized to provide channel signaling protocols, e.g. according to SS7/C7 Interconnection. Thus, according to a preferred embodiment, the gateway server 280 according to the invention acts as an autarchic and neutral telecommunication network C which is provided by network operator C.

According to a preferred embodiment the network server 280 is provided with a switching technology so that the network server or also gateway server 280 can establish a connection between two incoming call requests 285 and 290. In this preferred embodiment the network server 280 is realized to be capable of interconnecting two communication links 285 and 290 present on the network server in such a way that a communication link 250 is established thereby between terminals 205 and 220.

In another preferred embodiment the network server 280 is equipped in such a way that the call request from a telecommunication terminal 205 can be verified to the effect that the destination call number of the telecommunication terminal or telecommunication service 220 inquired by telecommunication terminal 205 is verified for the legitimacy thereof. Thus, in this preferred embodiment, the network server 280 affords inter alia the advantage that those call requests from telecommunication terminal 205 that would be switched to undesired telecommunication terminals or telecommunication services 220 can be suppressed or prevented by corresponding filter mechanisms that are installed on the network server 280 in a computer-implemented manner.

Therefore, the switching system according to the invention particularly affords advantages for those organizations that make telecommunication terminals for the official use thereof available to their members. For instance, if a service telephone 205 is provided in a company, all calls from this telephone 205 are now routed via the central gateway 280. The central gateway 280, again, will constitute and represent a neutral network C compared to network operators A and B by providing switching components and channel signaling protocols, for instance, according to SS7/C7 Interconnection. Thus, according to this preferred embodiment, the gateway server 280 according to the invention acts as an autarchic and neutral telecommunication network C, which is provided by network operator C. On this gateway server or network server 280 companies that have, for instance, their mobile service phones 205 correspondingly registered, can have a central control entity 280 established for any of these telephones by means of gateway server 280, which is capable of controlling which calls or destination call numbers 250 can be dialed with the mobile terminal 205, and which cannot. Thus, the company is able to perform a cost control for any of these mobile phones 205 at any time, and can guarantee by means of permission levels (e.g. international calls are permitted or not permitted) a very finely structured cost and permission control. In a preferred embodiment this is possible by means of lists for permitted call numbers (white lists) and prohibited call numbers (black lists) stored on the network server 280 and corresponding access regulations. In this preferred embodiment gateway server 280 will compare each call request 285 with these lists and regulations and establish only those connections 250 that are desired, i.e. those connections 250 that are in conformity with the number lists and regulations stored for terminal 205.

According to a preferred embodiment, therefore, those call numbers or parts of call numbers (e.g. area codes) are stored in memory 283 of network server 280 for which no connection is to be provided via network server 280. In this preferred embodiment, for instance, organizations, for the members of which mobile phones are made available for official use, are able to prevent that connections are established from these mobile phones to terminals 220 or telecommunication services 220 that are not covered by the official purpose of these provided communication devices 205. Insofar, this preferred embodiment of the network server 280 is capable of preventing the unexpected or/and undesired occurrence of particularly high charging fees by network operator B of network 225 and/or telecommunication services 220.

The method and the procedure of switching the call request 270 from telecommunication device 205 via network server 280 will be explained in more detail by means of FIG. 4.

It is already obvious from FIG. 2 that the present invention allows the call direction 250 between telecommunication units 205/220 by interposing a neutral server 280. In the embodiment shown in this figure the server 280 is, therefore, adapted in such a way, e.g. by corresponding switching and routing components as well as by providing interconnection capability, for instance, according to C7/SS7, that it is accepted by other network operators 210/225 or NB, respectively, and by possibly relevant regulating authorities within the scope of regulating charges in the field of call termination as operator of a public telecommunication network 280 or network operator 280, and is represented correspondingly. The server 280 is not built on an existing provider infrastructure of providers A and B, but, according to the invention, provides an own telecommunication infrastructure institution 280 so that, for the termination of calls from and to network 280, network operators NB (have to) regard network 280 as a line transmission network 280 or fixed network 280, respectively.

To this end, in a preferred embodiment, registration of the fixed network server 280 as a service is requested at the corresponding regulating authorities, in Germany for instance the Federal Network Agency, so that fixed network server 280 is registered as network operator C, in Germany for instance as subnetwork having the full call number capacity. In a preferred embodiment the call number capacity on server 280 is obtained in such a way that software components of server 280 are adapted to store call numbers on server 280. To this end, in a preferred embodiment, call numbers for server 280 are applied for at the corresponding regulating authorities, and these numbers or alternatively existing call numbers are ported to server 280. In this preferred embodiment the evidence of network operation capability, for invoicing the connections between the network operators and for participating in the exchange of porting data, can thus be furnished for server 280 to the corresponding authorization and regulating authorities. In this embodiment the physical network of server 280 can, thus, be small, in one embodiment it may only consist of the server 280 itself. However, this physical size has no effect on the operating mode because the call numbers in question are logically stored on the server 280, independent of the size. Moreover, in a preferred embodiment, this registration with a main network operator of the respective national telephone network, in Germany for instance the Deutsche Telekom AG, is further registered for the exchange of porting data, so that calls are routed into the respective national network, are allocated to the call numbers and signaling addresses stored on the server 280 and are then passed on to the communication network constituted by server 280. To this end, the main network operator of the respective national telephone network will arrange for the interconnection of server 280 or network C, respectively, which is constituted by server 280, with the network of the main network operator of the respective national telephone network, will test the interconnection with server 280 on the basis of the relevant protocols and enable this interconnection if the test was successful.

In case the link 250 is aspired not only as a link 250 across networks (e.g. mobile-to-mobile or fixed-to-mobile) and, for instance, on a national basis, but above all also as an international link 250, the neutral server 280 will, in another embodiment, be realized in such a way that additional country-specific neutral servers 280 supplement the server structure 280. In this preferred embodiment server 280 is therefore realized as at least one country-specific neutral server 280 and at least one central neutral server 280. In this preferred embodiment the link 250 e.g. from a country X to another country Y is aspired, that is, terminal 205 is registered in a first country X and terminal 220 is registered in another country Y, and both networks 210/220 are each constituted in different countries X and Y.

In another embodiment the signaling 285 from the first terminal 205 to the central fixed network server 280 is initially sent to one of the country-specific servers 280, namely to that country-specific server 280 that is constituted in country X in which terminal 205 is located and in which terminal 205 is registered. In this embodiment, just like in the embodiments described above or below, the signaling can be accomplished by dialing the call number of server 280 by terminal 205, or alternatively also by protocols such as DTMF (Dual Tone MultiFrequency), USSD (Unstructured Supplementary Service Data) or GPRS (General Packet Radio Service) or other comparable data and/or communication protocols. This signaling is forwarded to the country-specific fixed network server 280 which is constituted, for instance in the U.S.A., and is passed on, e.g. per IP service, largely free of charge, for instance, by data flat rates, from this fixed network server 280 to the central neutral server 280 constituted, for instance, in Germany.

Hence, the technology according to the invention is internationally usable and operable, without having to provide a switching infrastructure all over the world. In this preferred embodiment a single switch may be sufficient, namely that of the central neutral server 280, at least if there exist agreements with the operator of an existing switch in the U.S.A. (in this example) on the forwarding of signals and signaling 285.

Figure 3:
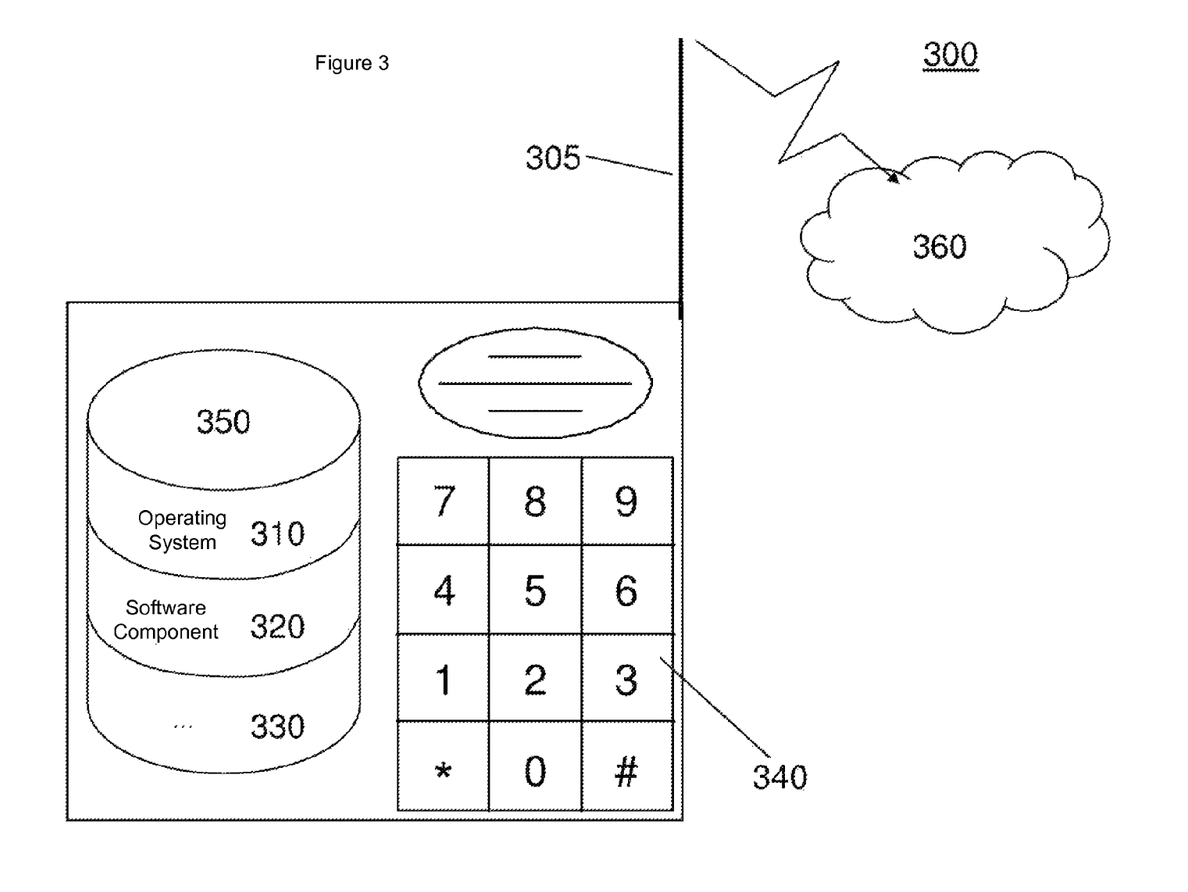
FIG. 3 shows a schematic representation of a mobile telecommunication terminal according to a preferred embodiment of the present invention.

FIG. 3 schematically shows the structure of a telecommunication terminal 300, which corresponds to the telecommunication terminals 105, 120, 205 and 220 shown in FIGS. 1 and 2.

In a preferred embodiment telecommunication device 300 is designed as a mobile telecommunication terminal or mobile phone. However, the realization as a mobile telecommunication device 300 is merely of an exemplary nature. The switching system according to the invention also allows the interworking with fixed network telecommunication terminals, mobile or permanently installed data terminals and/or also the interworking with data or communication receivers.

A preferred embodiment of the telecommunication terminal 300 includes a unit 305 which is suited to establish a connection to the network 360 of a network operator A, in which the telecommunication terminal 300 according to the invention is registered. In FIG. 3, this unit 305 is exemplarily realized as the antenna of a mobile telephone. This is only an exemplary embodiment of this connection unit 305, however, which, according to the present invention, may likewise be realized as a line transmission link, a satellite link or any other form of data or speech protocol link.

The telecommunication terminal 300 further comprises a unit 340 which is designed as an input device 340. In a preferred embodiment the unit 340 is realized in form of a keypad by means of which the user of mobile phone 300 can input the destination call number of a destination telephone 220. The design of unit 340 as numeric keypad is merely of an exemplary nature, however, so that any other form of technical realization of a human-machine interface for the input of a call number according to present invention is usable. Specifically, the input interface 340 may also be realized in the form of a speech recognition interface, a touchscreen, a computer keyboard or a pointing device.

The telecommunication terminal 300 according to the invention further comprises units 350 for the storage of software 320/330 and data 330 as well as an operating system 310.

In a preferred embodiment the unit 350 is designed in the form of a storing unit, which may be realized both as RAM but also as ROM memory or also with or by rotating or permanent storage technologies. In the schematic representation of FIG. 3 unit 350 stores, in a preferred embodiment, at least an operating system 310 and a specific software component 320, wherein in particular the software component is part of the inventive switching system 200. The storage of both components 310 and 320 is merely of an exemplary nature, however, so that unit 350 could also accommodate other components 330.

In an preferred embodiment of the telecommunication terminal 300 the operating system 310 is supplied by the manufacturer of this telecommunication terminal 300 together with this telephone 300. Therefore, the operating system provides for the basic functions of the telecommunication terminal 300, while other components 320 and 330 can provide for additional functions by storing and installing these components on the mobile phone 300. The realization of the operating system 310 as a software component that is stored on the unit 350 in the telecommunication terminal 300 is merely of an exemplary nature, however. The basic functions of the telecommunication terminal 300 could also be realized as electronic components, and the telecommunication terminal 300 can in particular comprise several units 350.

The software component 320 of the telecommunication terminal 300 is provided for the telecommunication terminal 300 by the network operator C of network 280, which was already shown in FIG. 2. The software component 320 provided by the network operator C is, in a preferred embodiment, stored on unit 350 and installed in telecommunication terminal 300 in such a way that the software component 320 is capable of connecting itself between, for instance, an automatic call acceptance process of the operating system 310 of the telecommunication terminal 300 in the event of a call from or to the telecommunication device 300. In this preferred embodiment the software component 320 connects itself between the operating system 310 and the unit for the call establishment 305 so that, regardless of the call number inputted by means of unit 340 on the telecommunication terminal 300, the software component 320 is capable of influencing which call number is actually dialed by the connection unit 305.

Also, the installation of the software component 320 is accomplished in such a way that the software component 320, in the event of a call received via the connection unit 305, can analyze the incoming call number with respect to the identity of the calling or requesting terminal and can affect the operating system 310 of the telecommunication terminal 300 in such a way that this incoming call is accepted or a "busy" signal is sent as response instead.

Therefore, in a preferred embodiment, the software component 320 is stored and installed both on the telecommunication device 205 and the telecommunication device 220, so that the software components 320 on these telecommunication terminals 205/220 allow together with the network server 280 the switching of calls according to switching system 200. Thus, in a preferred embodiment of the present invention, the whole communication link from telecommunication device 205 to telecommunication device 220 is technically and, thus, automatically controlled by the fixed network server 280 and, thus, both columns (terminals) of the link as well as both directions of the link 250.

In a preferred embodiment a smallest possible part of the technology necessary for this control is integrated in the software components 320 of the terminals 205/220 so as to produce a greatest possible device compatibility, so that this software component 320 can be migrated to a greatest possible variety of terminal types. In this embodiment, however, the larger part of the technology necessary for this control will be stored on the central neutral server 280.

Preferably, the software component will be provided with features that allow the storage of a matrix of tariff and home country of the user. Furthermore, in this embodiment, the current network code number, hence the location of the user, as well as the destination of the call 285 based on the area codes, and other available networks such as WLAN, GPRS, EDGE, GSM, UMTS or the like are stored in the software component 320.

Preferably, the software component 320 performs a monitoring of the currently available networks of the location (network code number) and the inserted identification card (tariff and home country), e.g. the SIM card. In one embodiment this monitoring will further include the incoming and outgoing calls, e.g. by reading out these call numbers "from the right", because the transfer of international dial codes is not consistently regulated. Preferably, in response to this monitoring corresponding to the matrix, the software component 320 will further initiate an action of the respective terminal 300 directly through the identification card or SIM card, such as callthrough, callback, callreverse, WLAN call or the like.

The course of this call switching will now be further explained with reference to FIG. 4.

Figure 4:
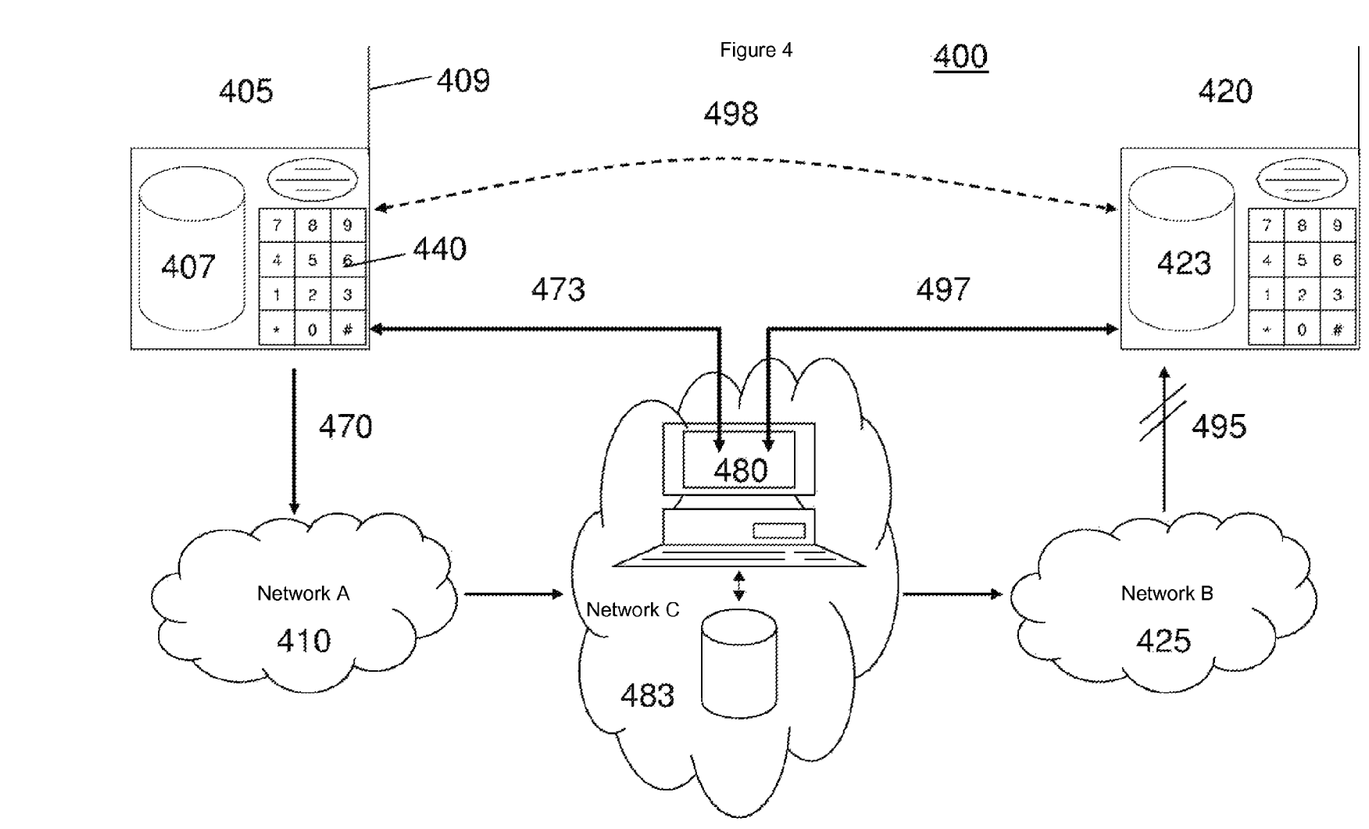
FIG. 4 shows a schematic view of the elements and procedures of a switching system according to a preferred embodiment of the present invention.

FIG. 4 shows the interaction of the individual components of the switching system 200 and 400, which has in parts already been schematically represented in FIG. 2.

Specifically, FIG. 4 shows the telecommunication terminals 405 and 420, which are embodied similar to telecommunication device 300 and, in particular, include each a software component 407 and 423. According to the call-directing switching system 400, if the user inputs a call number on terminal 405 by means of the input interface 440, the software component 407 is activated. This software component 407 connects itself between the operating system component 310 of terminal 405 and the connection unit 409 and, instead of transferring a call request to terminal 420, will transfer a call request 470 to network server 480 at the network operator A of network 410. This means that, according to the embodiment of the mobile terminal 405, the software component 407 stores the inputted call number at least temporarily and establishes a connection 470, which is directed to fixed network server 480, to network 410, regardless of this call number inputted by the user.

This call request 470 can be executed, for instance, by dialing a specific call number of the fixed network server 480 which is stored in the software component 407. Based on connection 470 and the corresponding call request to the fixed network server 480 the network operator A of network 410 will establish a connection between the mobile terminal 405 and the fixed network server 480.

According to a preferred embodiment the fixed network server 480 analyzes the call number of the incoming call request 470 at least in terms of whether the call number of the incoming call request 470 derives from a device 405 that is registered on the fixed network server 480 for the switching service of the fixed network server 480. In a preferred embodiment the fixed network server 480 identifies by means of the so-called network-provided ID the identification of the calling telecommunication terminal 405. This ID serves the financial settlement between network operators and is therefore always transmitted, also in the case of call number identification restriction.

The identification may also by accomplished by means of alternative methods, however. In the preferred embodiment the identification is realized, in particular, by a robust method, especially international, e.g. C7/SS7 protocols, which may be designed slightly different from one another especially in international mobile radio networks 410/420. Therefore, according to the inventive technology, methods which exhibit a certain robustness are chosen for identifying the terminals 405/420 on the network server 480, e.g. by regulations such as the standardization of the maximum length of the call number to 12 digits including the country code (e.g. Germany: 49) or, further, the interpretation of the call number from the end, i.e. from the right.

Moreover, in a preferred embodiment, the fixed network server 480 may use the transferred ID to allocate the calling telecommunication device 405 to a specific service category. In a preferred embodiment this allocation can entail that only certain call numbers are accepted by the fixed network server 480 for the forwarding of call requests of telecommunication terminal 405. In other words, in this preferred embodiment the further procedure is stopped if, with the call request of telecommunication terminal 405, a call number is transferred to the fixed network server 480 which belongs either to "prohibited" call numbers or not to the "permitted" call numbers.

Thus, the switching of the call originating at telecommunication terminal 405 via the fixed network server 480 allows the definition of specific "white lists" (permitted call numbers) or "black lists" (prohibited call numbers), so that organizations providing their members, for instance, with mobile phones 405 for official use are able to control the call numbers being called from these telecommunication devices 405. This particularly yields the advantage that the organizations are enabled by means of a central gateway 480 to suppress very expensive call numbers, such as international numbers and/or call numbers of value-added services or information services or, respectively, to disallow the switching to those numbers. In this preferred embodiment the fixed network server 480 preferably transfers a signal to the mobile terminal 405 which can be interpreted by the user of this device 405 as a message within the meaning of "call not permitted", so that the connection can be interrupted by the fixed network server 480 after the transfer of this signal.

According to a preferred embodiment the network server 480 is designed as a fixed network server, so that the fixed network server 480 forms part of a fixed telecommunication network C which is provided by a network operator C. According to this preferred embodiment a connection 473 is established from mobile terminal 405 via the fixed network to network server 480. Via the established connection 473 the software component 407 on terminal 405 transfers the call number of the target device 420, which was inputted on the input interface 440, to the fixed network server 480. This transfer may be accomplished in different protocols or transmission methods. For instance, this transfer may be accomplished by DTMF dial tones, USSD protocol or also GPRS data, or other protocols or transmission methods according to the prior art.

The call number of terminal 420 thus transmitted by the software component 407 from mobile terminal 405 via the fixed network connection 473 to the fixed network server 480, again, is used by the fixed network server 480 to place a call request directed to terminal 420 via the network 425 of network operator B. In a preferred embodiment the network server 480 dials the call number transferred by terminal 420.

The network operator B of network 425 will request a connection 495 towards terminal 420 according to the number dialing of the fixed network server 480 or according to the call request of the network server 480. According to the present invention, similar to telecommunication terminal 405, a software component 423 is also stored and installed on telecommunication device 420. Thus, similar to telecommunication device 405 according to the present invention, telecommunication device 420, too, is designed like the exemplary telecommunication device 300 according to FIG. 3. Therefore, when a call comes in, the software component 423 on telecommunication device 420 is switched on, i.e. the software component is activated by an incoming call or incoming call request. In a preferred embodiment the software component 423 connects itself, for instance, between the automatic call acceptance process of the operating system 310 of terminal 420. In a preferred embodiment the software component 423 analyzes the call number of the incoming call 495 at least in terms of whether this call number corresponds to the call number of the fixed network server 480 stored in software component 423. According to a preferred embodiment this identification can be accomplished by the so-called network-provided ID of the caller which, according to the prior art, is transmitted with each call request as the ID for accounting purposes.

The so-called network-provided ID is merely of an exemplary nature, however, so that both the identification of the calling telecommunication device 405 on fixed network server 480 and the identification of the calling network server 480 on terminal 420 can also be carried out by means of alternative identification methods according to the prior art.

In a preferred embodiment, if the software component 423 on terminal 420 identifies the known call number of the fixed network server 480 by means of the identification method, the operating system 310 of terminal 420 is induced by the software component 423 installed on terminal 420 to signal a "busy" signal in response thereto. By this, indeed no connection 495 is established between the fixed network server 480 and the terminal 420 if a call request is placed from the fixed network server 480 via network 425 to the terminal 420. However, the fixed network server 480 does not transmit this signal, the "busy" signal, to terminal 405, but will continue to maintain the connection 473 instead and signal a dial tone to the terminal 405 or user of this terminal, respectively.

In response to the identification of an incoming call from the fixed network server 480 and the initialization of a "busy" signal the software component 423 will initiate a call request from telephone 420. In this preferred embodiment, in response to the call request from fixed network server 480 recognized on terminal 420, the software component 423 installed on terminal 420 will induce the operating system 310 of terminal 420 to place a call request 497 to fixed network server 480.

According to a preferred embodiment the software component 423 will, for this purpose, induce the operating system 310 of terminal 420 to dial the calling number of fixed network server 480 which is stored in the software component 423. By this, a call request is routed to the fixed network server 480 via network operator B of network 425 in which terminal 420 is registered. The software component 423 of terminal 420 therefore calls the fixed network server 480 back (reverse callback) while the connection 473 is maintained by this fixed network server 480, and the fixed network server 480 will accept this call or this call request 497 from terminal 420 if a positive identification of terminal 420 can be carried out on network server 480 by means of a method similar to that described above.

According to a preferred embodiment the fixed network server 480 is provided with switching components so that the fixed network server 480 can interconnect by these switching components the held call 473 and the accepted call connection 497 so that a connection 498 is created between terminals 405 and 420.

By the interaction of the software components 407 and 423 of the telecommunication terminals 405 and 420, with the cooperation of the fixed network server 480, a connection is thus established in a fixed network, specifically network 483 of network operator C, by both sides, i.e. by terminal 405 and by terminal 420. This allows a clearly more cost-efficient connection 498 between terminals 405 and 420 because only one fixed network connection is dialed by either side, while alternatively, according to the prior art and as shown in FIG. 1, a clearly more expensive connection via different mobile radio networks would be necessary.

Furthermore, this call-directing switching method for calls between different telecommunication networks, which is realized by the central gateway 480, not only allows a more cost-efficient connection, but also the control of the dialed connections, so that only those connection 498 are possible via fixed network server 480 that are desired, i.e. permitted and wanted. As was described above it is possible to store prohibited call numbers on the fixed network server 480 in so-called "black lists". Equally, positively permitted call numbers can be stored there in corresponding "white lists". Thus, it is possible to offer special rates to the users of terminals 405 and 420 as the call numbers that can be dialed by a terminal 405, can be controlled and limited by the interaction of the software component 407 and the fixed network server 480. Thus, companies providing their staff members with mobile phones for official use are able to control the utilization of these mobile phones efficiently by the switching systems 480.

Hence, the interaction of the software components 407 and 423 and the fixed network server 480 provides for a method which allows the establishment of a connection between mobile terminals at minimum costs along with a maximum of control. This method establishes this cost-efficient connection in the described preferred embodiment by the fixed network server 480 forming part of a "neutral" fixed network 483. Thus, it is possible that, for instance, a mobile phone 405 has to establish exclusively cost-efficient connections to a fixed telecommunication network in order to obtain a connection to mobile terminal 420, as the latter, in turn, only establishes a connection 497 to a more cost-efficient fixed network in the end. Thus, it is avoided that a great deal of expensive calls have to be terminated in mobile radio networks 110 and 125. Hence, a targeted direction control of the calls of mobile terminals 405 and 420 takes place so that, instead of a direct connection incurring significantly higher costs, both mobile terminals each make calls to the same fixed network 483 and can thus profit by regulated prices for the provision of fixed network services.

Hence, the present invention can bring about economic benefits in particular where heterogeneous costs for the termination between two networks 410/425 have been determined and agreed on. The present invention is, therefore, usable not only in the field of mobile networks—where it is especially advantageous, however, on account of the high termination rates.

The call-directing optimization method therefore yields the particular advantage that on the part of the terminals 405 and 420 the essential functions for providing this method are realized by the software components 407 and 423, which a user of these terminals may install on his terminal. This makes it possible that the user can profit by this optimized method and the opportunities of the switching system without having to actually change his use behavior. In a preferred embodiment the software components 407 and 423 therefore assume at least functions of identifying callers and transforming this identification to a reaction of the terminal 405 and 420. To this end, the software components 407 and 423 are provided in a preferred embodiment with corresponding parameters so as to ensure, by means of the parameterization, a correct identification and reaction behavior of the terminals 405 and 420, preferably adjustable by the user of the respective terminals.

In a preferred embodiment all points of the communication chain 498, i.e. the terminals 405/420 and the server 480, are therefore associated with each other in a systematically controlled manner. This allows not only the above-described definition and use of white and black lists on the server 480, but—irrespective thereof—it also allows the use of such white and black lists already on the terminal 405, with a functionality similar to that described above. In this embodiment the connection setup 498 is controlled in two stages, the control being accomplished in a first stage by the defined lists on terminal 405 and in a second stage on the server 480. In this embodiment additional knowledge about the tariff type used can be used on terminal 405 to establish particularly cost-efficient connections to server 480, e.g. by making use of flat rates and by deliberately avoiding costs for the switching in specific networks.

According to the invention this complex and, if necessary, multi-stage control of the call direction is carried out fully automatically so that the operator of server 480 is not visible to the respective user of terminals 405/420, and the user does not have to change his use behavior and need not interfere manually either.

According to a preferred embodiment the fixed network server 480 further comprises so-called C7 or SS7 Interconnection features as to be able to process the corresponding signals and charge the services to and from network operators. In addition to this C7 or SS7 Interconnection the fixed network server 480 comprises, in a preferred embodiment, a complete call number management and porting capability of the respective country in order to allow the charging of fees. However, in an alternative embodiment the present invention may also be realized without a corresponding call number management as the switching of a call 498 between terminals 405 and 420 via connections 473 and 497 can also be carried out without this option.

According to another preferred embodiment the fixed network server 480 is adapted to allow the establish a connection from the terminal 405 to information services.

According to this preferred embodiment the terminal 420 is not realized in the form of a mobile telecommunication terminal, but comprises components and/or features for storing and transmitting information services and entertainment programs, such as radio-like programs and/or broadcasts. In this preferred embodiment the terminal 420 will have a direct connection to network 483, without another network 425 being connected via connection 497 between terminal 420 and network 483. In an alternative embodiment, however, the connection between the information and entertainment service infrastructure 420 and the network finder 83 can further be established by an intermediate network 425.

In this alternative embodiment in which, for instance, radio programs are provided via component 420, the software component 407 installed on terminal 405 can have additional functions which may be selected by the user of the terminal 405 by a corresponding user interface. On selecting these additional functions of the software component 407 by the user of terminal 405 a connection 473 is established from terminal 405 to fixed network server 480 by the terminal 405 dialing the corresponding call number of the fixed network server 480.

According to a preferred embodiment the fixed network server 480 will identify the incoming call 473 of terminal 405, so that the fixed network server 480—as was already described above—can identify the caller or terminal 405, respectively. Thus, the fixed network server 480 can identify terminal 405 to find out which value-added services or information services were subscribed to by the user of this terminal 405, for instance, by way of a subscription offered by the provider of the network 483. If such a registration exists, or if the terminal 405 is identified by the fixed network server 480 as a subscriber to such a value-added service, the fixed network server establishes a connection to terminal 420 in the manner described above in such a way that the information programs or entertainment programs provided on or via the fixed network 420 are transmitted via connection 473 to the mobile phone 405. In this way, for instance, broadcast-like teleservices can be provided by the fixed network server 480 with the use of infrastructure 420, which could also be refinanced, for instance, by broadcasting radio commercials or sponsored programs. As the user of the terminal 405 initiates the connection 423 via an inexpensive fixed network connection the user of terminal 405 incurs very limited costs, which can be adjusted, even time-independently, for instance by the registration for a corresponding flat rate tariff.

In another preferred embodiment the user of terminal 405, using the above-described radio-like teleservice 420, is able to react on interaction requests contained in the program by means of the telephone keyboard. In this way, for instance, a solution word can be inputted, whose individual components/letters/digits were broadcast during the program. This can provide evidence of an actively listening subscriber being attentive to all contents, for which the subscriber can be rewarded or authorized. Further, the embodiment may be used to evaluate a program or report, for instance, by grades. Moreover, in another preferred embodiment, personal data may be inputted in response to an acquisition of user data, or an amount may be inputted for betting on something, e.g. while a horse race is being broadcast. In addition, an SMS message or WAP link can be transmitted to the subscriber of terminal 405 during the broadcast of a program if this is desired by the subscriber by a corresponding interaction or if he is qualified by meeting special criteria. By this, for instance, a product in a commercial of the radio-like teleservice 420, which is considered attractive, can trigger a reaction in the subscriber to make him input, for instance, "1" for "more information". In response to this the subscriber can, in this preferred embodiment, receive an SMS message with an internet link to the website of a provider or an SMS message with a free 0800 infoline number. Furthermore, in this preferred embodiment, the subscriber can place a song presented in the radio-like teleservice 420 and appealing to the subscriber into a shopping cart, for instance, by inputting "PURCHASE" or "SAVE FOR LATER". This shopping cart may be stored on the terminal 405 or may have been installed on the user's PC previously for the radio-like teleservice 420. In this way an audio book or book or album could be presented in the radio-like teleservice 420 and could then directly be ordered from a retailer, e.g. Amazon, with one click on the telephone 405 keyboard via the mobile phone's user account.

Moreover, the fixed network server 480 can also cause the terminals 405 to actively contact the fixed network server 480 at a fixed time so as to receive a corresponding transmission of teleservices, namely by means of the above-described functions of the software components 407. In this preferred embodiment the fixed network server 480 will, for instance because of a registered subscription to a time-dependent transmission of teleservices, call a terminal 405 at this respective time via a connection 473. By means of the above-described identification method the software component 407 on terminal 405 will identify this call from the fixed network server 480, but will not accept the corresponding call and initialize a "busy" signal instead, in response to the identification of the call from fixed network server 480. In response to the identification of this call, however, the terminal 405 will, in turn, initialize a call to the fixed network server 480, so that a connection 473 to the server 480 is generated by the terminal 405.

This last-mentioned preferred embodiment is particularly advantageous if, for instance in the case of sportscasts, the live commentating of a soccer game is provided at a fixed time by means of information or value-added service components that are linked to the network 483. These broadcasts will start at a fixed time, so that the fixed network server 480, triggered by correspondingly stored subscription information, will initially request a connection to the terminal 405 at this starting time, and will thus cause the terminal 405 to establish, in turn, a connection to the fixed network server 480 in such a way that the user of the terminal 405 switches to the radio-like teleservice in time for the start of this, e.g., live broadcast of a soccer game, so as to witness this broadcast.

Hence, this embodiment not only allows a cost-efficient switching between different mobile radio terminals 405 and 420, but also the cost-efficient provision of radio-like teleservices on terminals, e.g. mobile phones, that are basically not equipped for the reception of radio programs. Due to the fact that the fixed network server 480 makes the terminal 405 establish a connection exclusively into a fixed network 483, the provision of these radio-like teleservices may be free of charge for the user of the terminal 405 or, in case of a flat rate, time-independent with respect to the costs.

Figure 5:
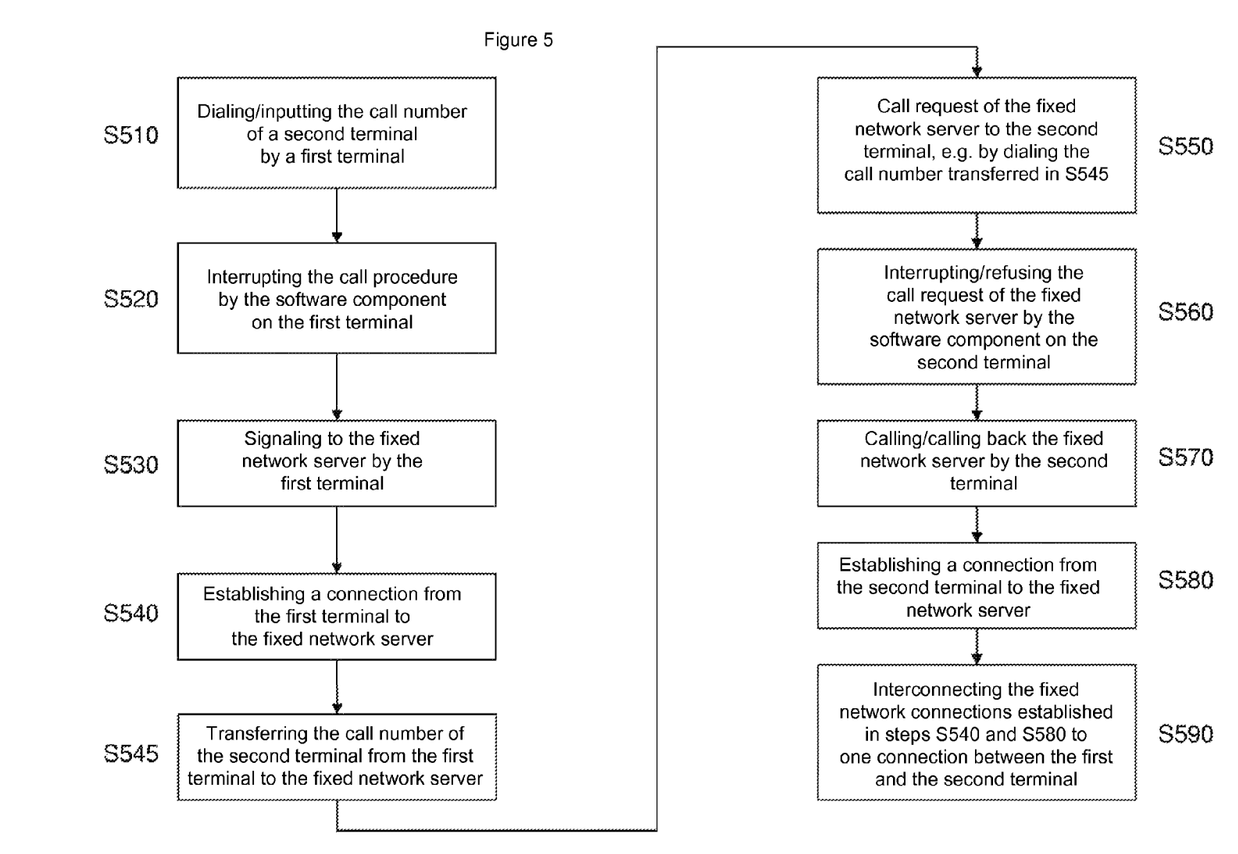
FIG. 5 shows a flow diagram of the different working steps of a switching system according to a preferred embodiment.

Finally, FIG. 5 schematically shows the process sequence of the call-directing switching method, which is provided by the fixed network server 480 and the corresponding software components 423 and 407. In step 510, terminal 405 dials the call number of terminal 420. In step 520, software component 407 will interrupt this call. In step 530, a signaling takes place in the background from the first terminal to the fixed network server 480, e.g. by terminal 405 calling the fixed network server or, alternatively, also by protocols such as DTMF (Dual Tone MultiFrequency), USSD (Unstructured Supplementary Service Data) or GPRS (General Packet Radio Service) or other comparable data and/or communication protocols. In step 540, the connection to the fixed network server is established via the mobile radio provider A of network 410. Transfer by terminal 405 of the call number of terminal 420 inputted on terminal 405 to the fixed network server 480 via the connection established to the fixed network server 480. By means of the C7/SS7 Interconnection capability provided on the fixed network server 480 a call to the call number of terminal 420 transferred by device 405 is signaled from the fixed network server 480 to the mobile radio provider B of network 425 in step 550. In step 560, this call forwarded by the mobile radio provider B of a terminal 420 is interrupted or refused by the software component 423 on terminal 420. In response to this interruption or identification of the call from fixed network server 480 terminal 420 initializes in the background the callback of fixed network server 480 or a call to the fixed network server 480 by the software component 423 installed on terminal 420, step 570. In step 580, the radio mobile provider B of network 125 will thereupon establish a connection to fixed network server 480. In step 590, an interconnection of the connections established in steps 540 and 580 is implemented on the fixed network server 480, so that a call between terminals 405 and 420 is established after step 590.

The invention claimed is:

1. A system for the call-directing switching of telecommunication links between at least two telecommunication terminals, with the telecommunication terminals each being registered in different telecommunication networks, the system comprising:

at least two telecommunication terminals, each telecommunication terminal including a software component which is adapted to initialize call requests originating at the telecommunication terminal and to transfer information about a desired destination call number via an established telecommunication link, wherein the software component is further adapted to analyze in case of received call requests the identity of the calling party and to refuse specific call requests on the basis of the identity analysis, and to initialize itself an outgoing call request in response to the refusal;

at least one fixed network server, the fixed network server including at least one switching component, and also including units that provide interconnection functionality, so that the fixed network server constitutes a neutral telecommunication network; and software-implemented units on the fixed network server, which are adapted in such a way that a call request received by the fixed network server from a first telecommunication terminal is analyzed with respect to the identity of the requesting telecommunication terminal and that a connection to the requesting telecommunication terminal is permitted and established in response to this identity analysis, and that a desired telecommunication link to a second telecommunication terminal is established on the basis of the identity analysis and the established connection.

2. The system according to claim 1, wherein the software component of the first telecommunication terminal is activated in the first telecommunication terminal by inputting a destination call number of the second telecommunication terminal, the software component stores the inputted call number at least temporarily in response to the activation, initializes an outgoing call request to the fixed network server and transfers the destination call number to the fixed network server via the telecommunication link established to the fixed network server.

3. The system according to claim 2, wherein the software-implemented units are further adapted to maintain the established telecommunication link to the first telecommunication terminal and initialize in parallel, by means of the transferred destination call number, a call request from the fixed network server to the second telecommunication terminal.

4. The system according to claim 3, wherein the software component of the second telecommunication terminal is activated in the second telecommunication terminal by the reception of a call request, the software component identifies a call request received from the fixed network server, refuses the connection in response to the identification, and initializes an outgoing call request to the fixed network server in response to the identification and refusal.

5. The system according to claim 4, wherein the software-implemented units are further adapted to maintain the connection to the first telecommunication terminal until a call request of the second telecommunication terminal is received on the fixed network server, and wherein further the switching component is adapted to interconnect in response to the establishment of a connection from the fixed network server to the second telecommunication terminal the connection to the first and to the second telecommunication terminal in such a way that a telecommunication link between the first and the second telecommunication terminal is established via the fixed network server.

6. The system according to claim 2 wherein the software-implemented units are further adapted to compare the call number transferred by the first telecommunication terminal with a list accessible by the fixed network server of permitted and/or prohibited call numbers, so that the call request from the first telecommunication terminal is refused by the fixed network server if the transferred call number does not belong to the list of permitted call numbers and/or belongs to the list of prohibited numbers.

7. The system according to claim 1 wherein the at least two telecommunication terminals are designed as mobile phones and the at least two mobile phones are each registered in another mobile radio network.

8. The system according to claim 1, wherein the second telecommunication terminal provides a media service, and the software-implemented units are further adapted to provide a connection to the desired media service in response to a call request of the first telecommunication terminal, so that a broadcast-like teleservice is provided for the first telecommunication terminal.

9. The system according to claim 8, wherein the software-implemented units are further adapted to initialize a call request to the first telecommunication terminal at a previously fixed time, wherein further the software component of the first telecommunication terminal is activated in the first telecommunication terminal by receiving the call request, the software component identifies the call request received from the fixed network server, refuses the connection in response to the identification and initializes an outgoing call request to the fixed network server in response to the identification and refusal.

10. A system for the call-directing switching of telecommunication links between at least two telecommunication terminals, in particular mobile radio terminals, the system comprising:
at least two telecommunication terminals which are capable of making fixed network calls at preferred terms in a defined geographic area,
a fixed network server having switching components and units for providing an interconnection functionality, wherein the server is capable of terminating incoming calls from networks of other telecommunication service providers, which are directed to destination numbers provided by this server, and further being capable of independently initiating calls to destination numbers of other telecommunication service providers,
wherein the at least two telecommunication terminals each include a special software component which permits to identify call requests initiated from the fixed network server to the respective telecommunication terminal and to refuse the same in response thereto, and to initiate itself a call request to an agreed destination number of the fixed network server,
wherein the fixed network server includes units which permit to couple an existing connection between a first telecommunication terminal and the fixed network server, which was initiated by the first telecommunication terminal, with an existing other connection between the fixed network server and a second telecommunication terminal, which connection was initiated by the second telecommunication terminal in response to the refusal of a call request from the fixed network server, so as to establish thereby a direct communication between the first telecommunication terminal and the second telecommunication terminal via the fixed network server.

11. A computer-implemented method for the call-directing switching of telecommunication links between at least two telecommunication terminals, with the telecommunication terminals each being registered in different telecommunication networks, the method comprising:
initializing an outgoing call request from a first telecommunication terminal to at least one second telecommunication and transferring a desired destination call number via an established telecommunication link;
analyzing incoming call requests on one of the telecommunication terminals with respect to the identity of the calling party, refusing specific call requests on the basis of the identity analysis, and initializing an outgoing call request of the telecommunication terminal in response to the refusal;
analyzing a call request received from the first telecommunication terminal with respect to the identity of the requesting telecommunication terminal on a fixed network server, which includes at least one switching component and units that provide interconnection functionality, permitting and establishing a connection to the requesting telecommunication terminal in response to the identity analysis, and establishing a desired telecommunication link to the second telecommunication terminal on the basis of the identity analysis and the established connection.

12. The method according to claim 11, wherein a software component of the first telecommunication terminal is activated in the first telecommunication terminal by inputting a destination call number of the second telecommunication terminal, the software component stores the inputted call number at least temporarily in response to the activation, initializes an outgoing call request to the fixed network server and transfers the destination call number to the fixed network server via the telecommunication link established to the fixed network server.

13. The method according to claim 12, further comprising:
maintaining the established telecommunication link to the first telecommunication terminal and initializing in parallel, by means of the transferred destination call number, a call request from the fixed network server to the second telecommunication terminal.

14. The method according to claim 13, wherein a software component of the second telecommunication terminal is activated in the second telecommunication terminal by the reception of a call request, the software component identifies a call request received from the fixed network server, refuses the connection in response to the identification, and initializes an outgoing call request to the fixed network server in response to the identification and refusal.

15. The method according to claim 14, further comprising:
maintaining the connection to the first telecommunication terminal until a call request of the second telecommunication terminal is received on the fixed network server, wherein further the switching component is adapted to interconnect in response to the establishment of a connection from the fixed network server to the second telecommunication terminal the connection to the first and to the second telecommunication terminal in such a way that a telecommunication link between the first and the second telecommunication terminal is established via the fixed network server.

16. The method according to claim 11, further comprising:
comparing the call number transferred by the first telecommunication terminal with a list accessible by the fixed network server of permitted and/or prohibited call numbers, so that the call request from the first telecommunication terminal is refused by the fixed network server if the transferred call number does not belong to the list of permitted call numbers and/or belongs to the list of prohibited numbers.

17. The method according to claim 11 wherein the at least two telecommunication terminals are designed as mobile phones and the at least two mobile phones are each registered in another mobile radio network.

18. The method according to claim 11, wherein the second telecommunication terminal provides a media service, and the method further comprises:

providing a connection to a desired media service in response to a call request of the first telecommunication terminal, so that a broadcast-like teleservice is provided for the first telecommunication terminal.

19. The method according to claim 18, further comprising: initializing a call request to the first telecommunication terminal at a previously fixed time, wherein further a software component of the first telecommunication terminal is activated in the first telecommunication terminal by receiving the call request, the software component identifies the call request received from the fixed network server, refuses the connection in response to the identification and initializes an outgoing call request to the fixed network server in response to the identification and refusal.

20. A non-transitory, computer-readable storage medium on which computer-readable instructions are stored, which, if they are executed by at least one computer, are adapted to execute the steps of:

initializing an outgoing call request from a first telecommunication terminal to at least one second telecommunication, the first and second telecommunication terminals each being registered in different telecommunication networks, and transferring a desired destination call number via an established telecommunication link;

analyzing incoming call requests on one of the telecommunication terminals with respect to the identity of the calling party, refusing specific call requests on the basis of the identity analysis, and initializing an outgoing call request of the telecommunication terminal in response to the refusal;

analyzing a call request received from the first telecommunication terminal with respect to the identity of the requesting telecommunication terminal on a fixed network server, which includes at least one switching component and units that provide interconnection functionality, permitting and establishing a connection to the requesting telecommunication terminal in response to the identity analysis, and establishing a desired telecommunication link to the second telecommunication terminal on the basis of the identity analysis and the established connection.

* * * * *